United States Patent [19]
Kawamura

[11] Patent Number: 5,178,109
[45] Date of Patent: Jan. 12, 1993

[54] HEAT-INSULATING ENGINE WITH SWIRL CHAMBERS

[75] Inventor: Hideo Kawamura, Samukawa, Japan

[73] Assignee: Isuzu Motors Limited, Tokyo, Japan

[21] Appl. No.: 851,025

[22] Filed: Mar. 13, 1992

[30] Foreign Application Priority Data

Mar. 14, 1991 [JP] Japan .................... 3-073786

[51] Int. Cl.$^5$ ............................................. F02B 19/02
[52] U.S. Cl. .................................. 123/292; 123/270; 123/254
[58] Field of Search ............... 123/292, 270, 254, 255, 123/256, 276, 271

[56] References Cited

U.S. PATENT DOCUMENTS

| | | | |
|---|---|---|---|
| 2,552,657 | 5/1951 | Ziegler | 123/292 |
| 3,168,083 | 2/1965 | Buchanan | 123/292 |
| 4,300,497 | 11/1981 | Webber | 123/292 |
| 4,424,780 | 1/1984 | Trucco | 123/292 |
| 4,854,281 | 8/1989 | Harayama et al. | 123/292 |
| 5,054,443 | 10/1991 | Kawamura | 123/292 |
| 5,069,178 | 12/1991 | Kawamura | 123/292 |

FOREIGN PATENT DOCUMENTS 59-21024 2/1984 Japan ..................... 123/292
1-19616 5/1990 Japan ..................... 123/292

*Primary Examiner*—Raymond A. Nelli
*Attorney, Agent, or Firm*—Browdy and Neimark

[57] ABSTRACT

This invention relates to a heat-insulating engine with swirl chambers which reduces a throttle loss due to the communication ports and increases the speed of a vortex flow within swirl chambers. The heat-insulating engine with swirl chambers comprises small communication ports each with a small passage area and large communication ports each with a large passage area formed at the lower portions of the swirl chamber blocks constituting heat-insulating swirl chambers, and control valves provided to large communication ports. During the compression stroke, the control valves close the large communication ports, and open the same ports during the expansion stroke after fuel injection and on rise in pressure in the swirl chambers. Accordingly, during the compression stroke, air is sent into the swirl chambers at high speed via small communication ports to increase a vortex flow speed within the swirl chambers. During the expansion stroke, the large communication ports being open, combustion gas and flame are forced into the main combustion chambers from the swirl chambers to reduce a throttle loss.

14 Claims, 1 Drawing Sheet

HEAT-INSULATING ENGINE WITH SWIRL CHAMBERS

BACKGROUND OF THE INVENTION

1. Field of the Invention

This invention relates to a heat-insulating engine with swirl chambers which includes main chambers at piston heads and swirl chambers at a cylinder head.

2. Description of the Prior Art

Swirl chambers of an engine with swirl chambers are described in Japanese Utility Model Laid-Open No. 21024/1984, for example. In this engine with swirl chambers, swirl chambers are provided to a cylinder head, swirl chamber blocks constituting the swirl chambers are made of a ceramic material as a whole, an air layer is defined in the major proportion of the fitting portions between the ceramic swirl chamber blocks and the cylinder head, the end portions of the fitting portions between the swirl chamber blocks and the cylinder head on the cylinder side are sealed gas-tight by a sealing material, and the fitting portions between the swirl chamber blocks and their insertion members are also sealed gas-tight by the sealing material.

Furthermore, a heat-insulating engine with swirl chambers has been developed to improve combustion of heat-insulating engines. For example, Japanese Patent Laid-Open No. 119616/1990 filed by the Applicant of the present invention discloses a heat-insulating engine with swirl chambers. In this heat-insulating engine with swirl chambers, swirl chambers equipped with fuel injection nozzles and having a heat-insulating structure are communicated with main chambers equipped with intake/exhaust valves by communication ports, control valves are disposed to open and close the communication ports, and the control valves open the communication ports near the end of a compression stroke of the engine so as to introduce at a stretch the intake air into the swirl chambers and close the communication ports during an intake stroke so as to inhibit the introduction of the intake air into the swirl chambers.

However, the problem with the engine having the swirl chambers is that when the combustion gas moves from the swirl chambers to the main chambers when the communication ports communicating the main chambers with the swirl chambers are throttled, a throttle loss occurs due to the communication ports and engine performance drops. On the other hand, the smaller the passage sectional area of the communication port, the higher the flowing speed of the vortex flow formed by the intake air introduced into the swirl chambers.

In engines with swirl chambers in general, forced stream of the combustion gas, that is, the flame, from the swirl chambers to the main chambers is limited to one direction. The outflowing speed at the initial stage of forced stream of the flame is high in the former half of flame blow-off if the pressure difference is great between the swirl chambers and the main chambers but drops in the latter stage of forced flame stream. Mixing with air existing in the main chambers needs a long time in this case, the combustion time becomes long, a fuel efficiency lowers and the drop of the outflowing speed results in the occurrence of hydrocarbons HC.

It is necessary in the heat-insulating engine with swirl chambers to elevate the combustion speed and to complete the combustion at an early stage. For, when a compression end temperature is higher by about 250° C. than a cold engine as in the case of the heat-insulating engine, the viscosity of the compressed air increases and the fuel injected into this air cannot mix ideally with the air. On the other hand, an ignition delay of the fuel is small in a high temperature atmosphere and the fuel can be ignited within a time of about 1/5th of that of the cold engine. Therefore, the fuel and the air must be mixed instantaneously but the initial stage mixing and combustion of the air and the fuel are preferably carried out in the rich fuel-air mixture with a limited equivalent ratio and lean premixed combustion are preferably carried out in a diffusion combustion portion.

SUMMARY OF THE INVENTION

It is a main object of the present invention to solve the problem described above and to provide a heat-insulating engine with swirl chambers, wherein large and small communication ports communicating swirl chambers with main chambers are disposed in a cylinder head, a passage area is increased so as to reduce a throttle loss due to the communication ports when a combustion gas is transferred from the swirl chambers to the main chambers through the communication ports, the passage sectional area is reduced so as to increase the flowing speed of a vortex flow when intake air is introduced from the main chamber side into the swirl chambers through the communication ports, both of the communication ports are opened when the passage sectional area of the communication ports is increased, and one of the communication ports are closed by control valves when the passage sectional area of the communication ports is reduced.

In a heat-insulating engine with swirl chambers, comprising a cylinder block constituting cylinders, a cylinder head fixed to the cylinder block, swirl chamber blocks disposed inside hole portions formed in the cylinder head and constituting swirl chambers having a heat-insulating structure, pistons reciprocating inside the cylinders, main chambers formed at the piston heads of the pistons, communication ports for communicating the main chambers with the swirl chambers, formed in the swirl chamber blocks, and fuel injection nozzles having injection ports thereof opening to the swirl chambers, and sequentially operated in a cycle of an intake stroke, a compression stroke, an expansion stroke and an exhaust stroke; the object of the invention described above can be accomplished by the heat-insulating engine with swirl chambers which further comprises small communication ports having a small passage area and large communication ports having a large passage area, formed in the swirl chamber blocks constituting the communication ports, and control valves for opening and closing the large communication ports, the control valves closing the large communication ports during the compression stroke and opening them at the time of the pressure rise of the swirl chambers during the expansion stroke after the injection of the fuel from the fuel injection nozzles.

In this heat-insulating engine with swirl chambers, the control valves are actuated by electromagnetic force, and the opening timing and valve lift quantity of the control valves can be controlled in response to the operating state of the engine such as the number of revolutions of the engine, a crank angle and an engine load. Therefore, the valve opening timing and the valve lift quantity can be changed freely in accordance with the operating state of the engine, opening of the large communication ports can be determined at an optimum timing and response can be improved.

Since the control valves of this heat-insulating engine with swirl chambers open the large communication ports in response to a pressure above a predetermined pressure inside the swirl chambers, the structure itself can be made simple.

In addition to the opening operation of the large communication ports by the control valves in response to the pressure above the predetermined pressure inside the swirl chambers, the control valves can be operated by an extremely small electromagnetic force if the control valves are constituted as solenoid valves operated by the electromagnetic force. Therefore, the control valves can be made compact and the response in the opening/closing operation can be improved.

In the heat-insulating engine with swirl chambers, air flows into the swirl chambers through the small communication ports during the compression stroke of the engine and can form a strong vortex flow inside the swirl chambers.

Fuel atomization injected from the multiple injection ports of the fuel injection nozzles in such a manner as to flow with this strong vortex flow travels while forming a free jet flow, enters an accelerated vortex flow zone, impinges against square wall surfaces of the swirl chambers, that is, the wall surfaces of the swirl chamber blocks while being carried by the vortex flow, is reflected by the wall surfaces, flows along the wall surfaces on the outer peripheral side of the vortex flow, and is uniformly dispersed, so that the fuel and the air are mixed at a stretch, ignited and burnt in match with the state where the ignition delay is short in the high temperature atmosphere.

The ignited fuel-air mixture burns quickly, the internal pressure of the swirl chambers rises instantaneously and the combustion is promoted. At the same time, the control valves that have so far closed the large communication ports are opened, the communication area becomes instantaneously great, the combustion gas and the flame inside the swirl chambers flow at a stretch into the main combustion chambers, the combustion speed rises without lowering the flame stream speed and in this manner, ideal secondary combustion is completed.

Accordingly, this heat-insulating engine with swirl chambers can reduce the throttle loss due to a communication port passage area that communicate the swirl chambers with the main chambers.

DESCRIPTION OF THE PREFERRED EMBODIMENTS

Figure 1:
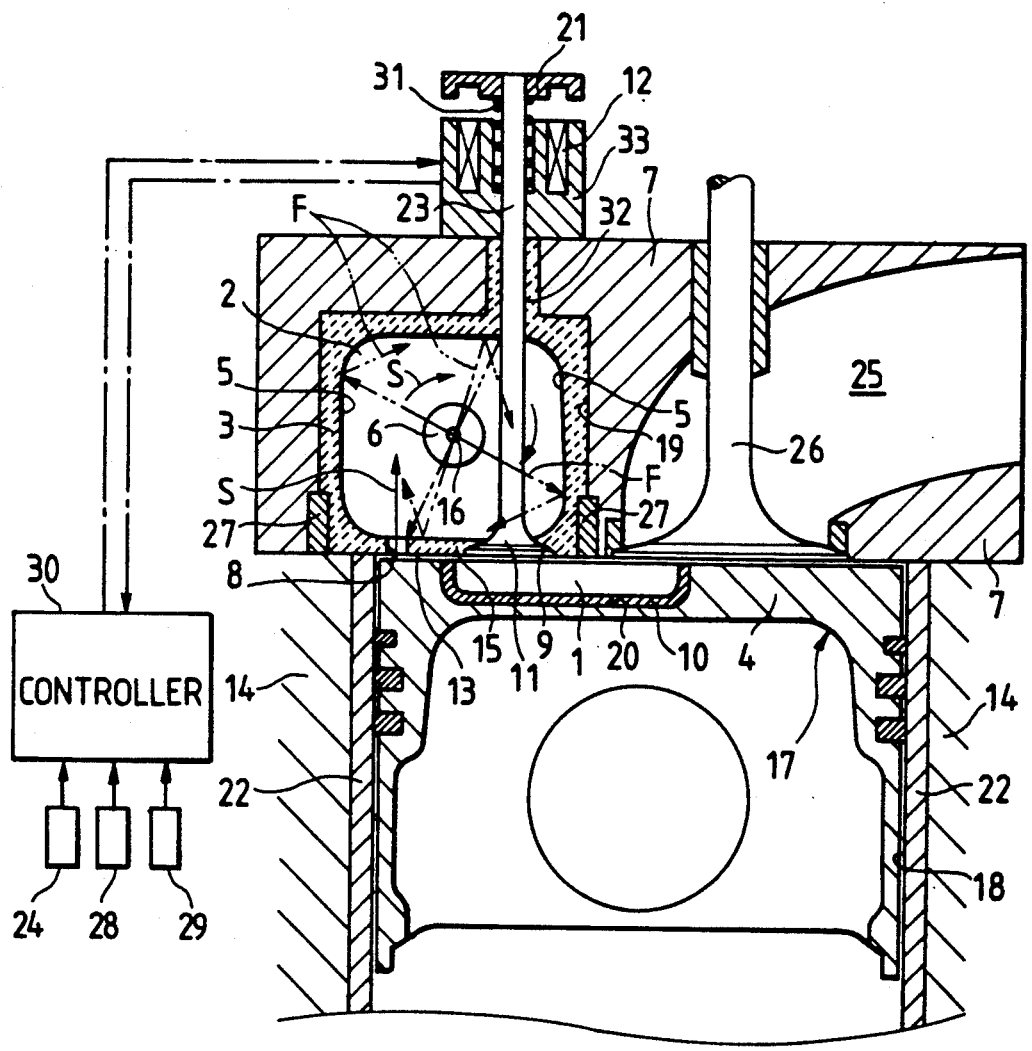
FIG. 1 is a sectional view showing an embodiment of a heat-insulating engine with swirl chambers according to the present invention.

Hereinafter, an embodiment of the heat-insulating engine with swirl chambers of the present invention will be explained with reference to the drawing.

FIG. 1 is a sectional view showing an embodiment of the heat-insulating engine with swirl chambers according to the present invention. As shown in the drawing, this heat-insulating engine with swirl chambers includes a cylinder block 14, a cylinder head 7 fixed to the cylinder block 14 and equipped with intake/exhaust ports 25 (only one of them being shown), swirl chambers 2 formed in the cylinder head 7 and having a heat-insulating structure, cylinder liners 22 fitted into hole portions defined in the cylinder block 14, a piston 17 reciprocating inside each cylinder 18 formed in the cylinder liner 22, a fuel injection nozzle 6 having multiple injection holes 16 thereof disposed inside each swirl chamber 2 and main chambers 1 each being constituted by a cavity 20 formed in the piston head 4 of the piston 17.

The heat-insulating structure of the swirl chambers comprises, for example, swirl chamber blocks 3 disposed in a hole portion 19 formed in the cylinder head 7 and made of a high heat-resistant and high heat-insulating ceramic material. The sectional shape of each swirl chamber 3 in the cylinder axial direction is shaped into the substantially square wall surfaces and this block 3 is fixed to the cylinder head 7 by fixing metals 27. A heat-insulating air layer can be formed, at time, between the outer side surface of the swirl chamber block 3 and the hole portion 19 of the cylinder head 7 to improve the heat-insulating property of the swirl chamber 2.

Each main chamber 1 is constituted in a heat-insulating structure by forming the cavity 22 of the piston head 4 by a heat-insulating wall body made of a ceramic, that is, by a main chamber block 10. An intake/exhaust valve 26 is disposed in each intake/exhaust port 25.

In this heat-insulating engine with swirl chambers, in particular, the thin wall member 15 of the lower surface of the swirl chamber block 3 constitutes part of the cylinder head lower surface 13. Large communication ports 9 are formed on the center side of the cylinder 18 of the swirl chamber block 3 and small communication ports 8 are formed around the peripheral side of the cylinder 18 of the swirl chamber block 3. Each communication port 9 is a passage having a large sectional area of the passage, and a switch valve, that is, a control valve 11, is disposed for opening and closing this passage. Each small communication port 8 is a passage having a small sectional area, and communicates always the swirl chamber 2 and the main chamber 1. In this heat-insulating engine with swirl chambers, further, the small communication ports 8 always communicate the main chambers 1 and the swirl chambers 2, and the control valve 11 is disposed in each large communication port 9.

For example, the passage sectional area of the small communication port 8 is so formed as to be up to 0.9% and the passage sectional area of the large communication port 9 is so formed as to be up to 3%. A valve face and a valve stem 23 constituting the control valve 11 are made of a high heat-resistant ceramic. Preferably, a valve guide 32 of the control valve 11 is formed integrally with the swirl chamber block 3 by a high heat-resistant ceramic. If the valve guide 32 and the valve stem 23 are made of a high heat-resistant ceramic, clearance between them hardly changes even when any temperature difference occurs between the valve guide 32 and the stem 23, so that the control valve 11 can slide smoothly and the gas does not leak from the swirl chambers 2 to the outside.

The control valve 11 can be constituted by a solenoid driving valve driven by the electromagnetic force as shown in the drawing. An attraction plate 21 made of a magnetic material is fitted to one of the ends of the valve stem 23 of the control valve 11, a coil case 33 serving as a magnetic path is disposed around the outer periphery of the upper part of the valve stem 23 and a solenoid coil 12 is disposed inside the coil case 33. A return spring 31 for biasing the control valve 11 in the closing direction is sandwiched between the coil case 33 and the attraction plate 21.

The opening/closing operation of the control valve 11 for supplying a current to the solenoid coil 12 is controlled by the instruction from a controller 30. Signals representing the engine operating state such as the engine revolution, crank position, engine load, etc, are inputted to the controller 30 and the opening/closing operation of the control valve 11 is controlled in response to the operating state. The engine load can be detected by a load sensor 24 for detecting the fuel flow rate supplied to the fuel injection nozzles or the step-on quantity of an acceleration pedal. The crank position can be detected by a position sensor 28. Engine RPMs can be detected by a rotation sensor 29. Receiving the angle signals of the engine operating state described above, the controller 30 decides and controls the opening timing and valve lift quantity of the control valve 11 in response to the angle signals.

Alternatively, the control valve 11 may be constituted in such a manner as to open the large communication ports 9 in response to a pressure above a predetermined set pressure inside the swirl chamber 2, instead of being controlled by the controller 30. For example, the control valve 11 is closed by the force of a spring and when the internal pressure of the swirl chamber 2 exceeds a set pressure, the control valve 11 is allowed to descend against this spring force so as to open the large communication ports 9.

The fuel injection nozzle 6 disposed in each swirl chamber 2 in this heat-insulating engine with swirl chambers is equipped with multiple injection ports 16 formed in the peripheral direction of the nozzle axis so that the injected fuel atomized radially into the swirl chamber impinges against the wall surfaces 5 of the swirl chamber block 3. The fuel injection nozzle 6 is so disposed as to extend in the horizontal direction from the center wall surface inside each swirl chamber 2 and the multiple injection ports 16 open towards the wall surfaces 5 of the swirl chamber 2. In other words, the inside of the swirl chamber 2 or the wall surface 5 of the swirl chamber block 3 is shaped so that the section in the axial direction of the cylinder 18 is square and has the square wall surfaces 5 with respect to the flowing direction of an air vortex flow S introduced via the small communication port 8.

As to the swirl block 3 constituting each swirl chamber 2, the injection direction of the injected fuel F from the multiple injection ports 16 of the fuel injection nozzle 6 is set so that it impinges against the square wall surfaces 5.

Furthermore, in this heat-insulating engine with swirl chambers, a cavity 20 is defined in the piston head 4 and the wall member 10 made of a ceramic, etc, is disposed on the wall surface of the cavity 20 so as to constitute each main chamber 1 in the heat-insulating structure. Each communication port 9 communicating the swirl chamber 2 with the main chamber 1 is so formed in the swirl chamber block 3 as to oppose one of the ends of the main chamber 1.

The heat-insulating engine with swirl chambers according to the present invention has the following feature because it is equipped with the small communication ports 8 and large communication ports 9 described above. In other words, the energy of the vortex flow S and free injection flow F occurring in each swirl chamber 2 is positively utilized, the injected fuel is allowed to impinge against the high temperature wall surface 5 and is reflected, mixing of the air and the fuel is instantaneously effected by utilizing heat energy and the combustion rate is increased.

Therefore, the intake air introduced from the small communication ports 8 forms the vortex flow S in the vertical direction with respect to the inflowing direction and the vortex flow S swirls as the vortex flow belt inside each swirl chamber 2. The fuel atomization F injected from the fuel injection nozzle 6 has energy of a certain extent and flows as the free injection flow F.

What is claimed is:

1. In a heat-insulating engine with swirl chambers, comprising a cylinder block constituting cylinders, a cylinder head fixed to said cylinder block, swirl chamber blocks disposed inside hole portions formed in said cylinder head and constituting swirl chambers having a heat-insulating structure, pistons reciprocating inside said cylinders, main chambers formed at said piston heads of said pistons, communication ports for communicating said main chambers with said swirl chambers, formed in said swirl chamber blocks, and fuel injection nozzles having injection ports thereof opening to said swirl chambers, and sequentially operated in a cycle of an intake stroke, a compression stroke, an expansion stroke and an exhaust stroke;

the improvement characterized in that the heat-insulating engine with swirl chambers futher comprises:

said communication ports including small communication ports having a small passage area and large communication ports having a large passage area, formed in said swirl chamber blocks; and control valves for opening and closing said large communication ports, said control valves closing said large communication ports during said compression stroke and opening said large communication ports at the time of the pressure rise of said swirl chambers during said expansion stroke after the injection of the fuel from said fuel injection nozzles.

2. A heat-insulating engine with swirl chambers according to claim 1, wherein the passage area of said small communication ports is not greater than 0.9% of the sectional area of said cylinder.

3. A heat-insulating engine with swirl chambers according to claim 1, wherein said passage area of said large communication ports is not greater than 3% of the sectional area of said cylinder.

4. A heat-insulating engine with swirl chambers according to claim 1, wherein the air introduced from said main chambers into said swirl chambers through said small communication ports having a small passage area during said compression stroke forms a strong vortex flow inside said swirl chambers.

5. A heat-insulating engine with swirl chambers according to claim 4, wherein the fuel is injected from said fuel injection nozzle into said vortex flow formed inside said swirl chambers, said fuel and the air mix to form a fuel-air mixture, said fuel-air mixture is ignited, said ignited fuel-air mixture burns rapidly and forms a combustion flame, and the pressure inside said swirl chambers rises.

6. A heat-insulating engine with swirl chambers according to claim 5, wherein said control valves are opened during said expansion stroke, so that said combustion flame inside said swirl chambers flows out at a stretch from said swirl chambers to said main chambers during said expansion stroke, mixes with the air existing inside said main chambers, shortens the combustion time and burns satisfactorily.

7. A heat-insulating engine with swirl chambers according to claim 1, wherein said control valves open said large communication ports at a pressure above a predetermined pressure inside said swirl chambers.

8. A heat-insulating engine with swirl chambers according to claim 1, wherein said control valves are actuated by electromagnetic force, and the opening time and valve lift quantity thereof are controlled in response to the operating state of said engine.

9. A heat-insulating engine with swirl chambers according to claim 1, wherein said control valves open said large communication ports in response to a pressure inside said swirl chambers above a predetermined pressure.

10. A heat-insulating engine with swirl chambers according to claim 1, wherein said swirl chamber blocks are constituted in a heat-insulating structure by a highly heat-resistant ceramic material.

11. A heat-insulating engine with swirl chambers according to claim 1, wherein said control valves are made of a highly heat-resisting ceramic material.

12. A heat-insulating engine with swirl chambers according to claim 1, wherein said large communication ports are formed on the center side of said cylinders and said small communication ports are formed on the peripheral side of said cylinders.

13. A heat-insulating engine with swirl chambers according to claim 1, wherein said swirl chambers formed in said swirl chamber blocks are formed so that the section thereof in the axial direction of said cylinders are square wall surfaces and are formed in the square form with respect to the flowing direction of the air vortex flow introduced from said small communication ports.

14. A heat-insulating engine with swirl chambers according to claim 13, wherein the fuel injected from said injection ports of said fuel injection nozzles is directed so as to impinge obliquely against said square wall surfaces.

* * * * *